(12) United States Patent
Maus et al.

(10) Patent No.: US 11,400,884 B1
(45) Date of Patent: Aug. 2, 2022

(54) VEHICLE-MOUNTED CRASH ATTENUATOR

(71) Applicant: TRAFFIX DEVICES, INC., San Clemente, CA (US)

(72) Inventors: Geoffrey B. Maus, Mission Viejo, CA (US); Jack H. Kulp, Dana Point, CA (US); Felipe Almanza, San Clemente, CA (US)

(73) Assignee: TRAFFIX DEVICES, INC., San Clemente, CA (US)

( * ) Notice: Subject to any disclaimer, the term of this patent is extended or adjusted under 35 U.S.C. 154(b) by 358 days.

(21) Appl. No.: 16/584,309

(22) Filed: Sep. 26, 2019

Related U.S. Application Data

(60) Provisional application No. 62/736,463, filed on Sep. 26, 2018.

(51) Int. Cl.
| | | |
|---|---|---|
| *B60R 21/34* | (2011.01) | |
| *B60R 19/00* | (2006.01) | |
| *B62D 21/15* | (2006.01) | |
| *B62D 21/20* | (2006.01) | |
| *B60R 21/00* | (2006.01) | |

(52) U.S. Cl.
CPC ............ *B60R 21/34* (2013.01); *B62D 21/152* (2013.01); *B62D 21/20* (2013.01); *B60R 2019/005* (2013.01); *B60R 2021/0011* (2013.01); *B60R 2021/0069* (2013.01); *B60R 2021/346* (2013.01)

(58) Field of Classification Search
CPC ... B60R 19/38; B60R 19/56; B60R 2019/005; B60R 2019/1893; B60R 2021/0083; B60R 2021/0074; B60R 2021/0011; B60R 2021/0069; B60R 2021/346; B60R 21/34; E01F 15/145; E01F 15/148; B62D 21/152; B62D 21/20
See application file for complete search history.

(56) References Cited

U.S. PATENT DOCUMENTS

| | | | | |
|---|---|---|---|---|
| 5,052,732 A | * | 10/1991 | Oplet | B60R 19/00 293/102 |
| 5,199,755 A | * | 4/1993 | Gertz | B60R 19/00 188/377 |
| 6,092,959 A | * | 7/2000 | Leonhardt | B60R 19/00 404/6 |
| 6,098,767 A | * | 8/2000 | Unrath | F16F 7/12 188/371 |
| 6,183,042 B1 | * | 2/2001 | Unrath | E01F 9/662 293/118 |
| 6,581,992 B1 | | 6/2003 | Gertz | |

(Continued)

*Primary Examiner* — Gregory A Blankenship
(74) *Attorney, Agent, or Firm* — Stout, Uxa & Buyan, LLP; Donald E. Stout

(57) ABSTRACT

Significant safety advantages are recognized for vehicle-mounted or attached crash attenuators, particularly in the form of structural improvements in the nature of a catch shelf which helps to prevent underride of an impacting vehicle, meaning that the impacting vehicle is less likely to release drop under the attenuator. When an impacting vehicle slides under the crash attenuator, there is an inability to take full advantage of the ride-down afforded by elements of the attenuator as they are crushed by the impact, thus potentially increasing damage to the impacting vehicle and injuries to its occupants.

17 Claims, 8 Drawing Sheets

(56) References Cited

U.S. PATENT DOCUMENTS

| | | | |
|---|---|---|---|
| 7,243,964 B1* | 7/2007 | Gertz | B60R 19/00 |
| | | | 188/377 |
| 7,438,337 B1 | 10/2008 | Gertz | |
| 7,802,829 B2 | 9/2010 | Maus | |
| 8,074,761 B2* | 12/2011 | LaTurner | F16F 7/126 |
| | | | 180/274 |
| 8,276,956 B2 | 10/2012 | Maus | |
| 8,702,137 B2 | 4/2014 | Maus | |
| 9,156,320 B2 | 10/2015 | Maus | |
| 9,399,845 B2* | 7/2016 | Buehler | B60R 19/38 |
| 11,008,717 B2* | 5/2021 | Roy | B60Q 7/02 |
| 2008/0179901 A1* | 7/2008 | Maus | G08G 1/09 |
| | | | 293/132 |
| 2009/0166998 A1* | 7/2009 | Groeneweg | E01F 15/088 |
| | | | 280/408 |
| 2021/0339695 A1* | 11/2021 | Maus | B60R 19/24 |

* cited by examiner

US 11,400,884 B1

VEHICLE-MOUNTED CRASH ATTENUATOR

This application claims the benefit under 35 U.S.C. 119(e) of the filing date of U.S. Provisional Application Ser. No. 62/736,463, entitled Vehicle Mounted Crash Attenuator, filed on Sep. 26, 2018, which application is commonly assigned with the present application, and is expressly incorporated herein by reference, in its entirety.

BACKGROUND OF THE INVENTION

This application is related to U.S. Pat. No. 7,438,337, entitled Vehicular Crash Attenuator, and to U.S. Pat. No. 7,802,829, entitled Trailer Mounted Crash Attenuator. Both of these prior patents are commonly assigned herewith and are expressly incorporated herein by reference, in their entirety.

FIELD OF THE INVENTION

This invention relates to attenuators which are particularly adapted for the absorption of energy in the event of an impact between an errant vehicle and a second, typically stationary or slow-moving vehicle, in the hope of minimizing injury to the occupants of both vehicles, and, more specifically, to truck-mounted or trailer-mounted crash attenuators. Such crash attenuators are disclosed in commonly assigned U.S. Pat. No. 7,438,337, entitled Vehicular Crash Attenuator, and to U.S. Pat. No. 7,802,829, entitled Trailer Mounted Crash Attenuator, both of which are herein expressly incorporated by reference, in their entirety.

While the Assignee has sold many of the attenuators described and claimed in the aforementioned patents under the registered trademark SCORPION, development has been ongoing on the product to ensure it meets and exceeds always-evolving government crash test standards. The invention described and claimed herein provides improvements designed to make an outstanding product even safer.

SUMMARY OF THE INVENTION

The present invention provides significant safety improvements for crash attenuators of the type discussed above, particularly in the form of structural improvements which helps to prevent underride of an impacting vehicle, meaning that the impacting vehicle is less likely to release drop under the attenuator. When an impacting vehicle slides under the crash attenuator, there is an inability to take full advantage of the ride-down afforded by elements of the attenuator as they are crushed by the impact, thus potentially increasing damage to the impacting vehicle and injuries to its occupants. Successfully addressing the potential problem of underride thus affords a marked improvement in safety.

More particularly, in one aspect of the invention, there is provided a crash impact attenuator for attachment to a host vehicle, which comprises a frame, a first impact attenuator module disposed on the frame, a second impact attenuator module disposed rearwardly of the first impact attenuator module on the frame, and a support flange disposed on a lower portion of the frame for supporting the second impact attenuator module. The support flange comprises a generally horizontally rearwardly extending portion which has an axial length sufficient to underlie at least one-third of an axial length of the second impact attenuator module.

Significantly, the axial length of the generally horizontally rearwardly extending portion of the support flange is sufficient to underlie at least one-half of the axial length of the second impact attenuator module.

The axial length of the generally horizontally rearwardly extending portion of the support flange is greater than four (4) inches, and typically about six (6) inches or more, in some exemplary embodiments. In exemplary embodiments, the frame comprises a strut portion and a cartridge portion disposed rearwardly of the strut portion, wherein each of the strut portion and the cartridge portion comprises structural tubes, the first impact attenuator module being disposed in the strut portion and the second impact attenuator being disposed in the cartridge portion. In some embodiments, the second impact attenuator module is disposed at a rear end of the cartridge portion, and the system further comprises a third impact attenuator module disposed forwardly of the second impact attenuator module on the cartridge portion. The support flange comprises the generally horizontally rearwardly extending portion and a generally vertically upwardly extending portion, each of the portions being joined together by an angled portion. The generally vertically upwardly extending portion comprises one or more apertures for securing the support flange to the frame.

In exemplary embodiments, the generally horizontally rearwardly extending portion of the support flange is longer than the generally vertically upwardly extending portion of the support flange. The second impact attenuator module comprises an angled panel, a rear panel, an angled joint transitioning the angled panel to the rear panel, and a second angled joint transitioning the angled panel to a side panel, the angled panel, the rear panel, and the side panel defining, in part, a hollow interior in which honeycomb material or other suitable crash attenuating material is disposed, wherein the generally horizontally rearwardly extending portion of the support flange extends rearwardly of the second angled joint of the second impact attenuator module.

The second impact attenuator module comprises an enclosed container having a hollow interior filled with a crash attenuating material, the crash attenuating material being crushable during a vehicular impact to a minimum effective axial length, wherein the generally horizontally rearwardly extending portion of the support flange extends rearwardly to a point beyond the minimum effective axial length of the second impact attenuator module, thereby creating a catch shelf on an upper surface of the generally horizontally rearwardly extending portion of the support flange behind a rearmost portion of the fully crushed second impact attenuator module.

In another aspect of the invention, there is provided a crash impact attenuator for attachment to a host vehicle, which comprises a frame, a first impact attenuator module disposed on the frame, a second impact attenuator module disposed rearwardly of the first impact attenuator module on the frame, and a support flange disposed on a lower portion of the frame for supporting the second impact attenuator module. The support flange comprises a generally horizontally rearwardly extending portion and a generally vertically upwardly extending portion, each of the generally horizontally rearwardly extending portion and the generally vertically upwardly extending portion being joined together by an angled portion. Significantly, the generally horizontally rearwardly extending portion of the support flange is longer than the generally vertically upwardly extending portion of the support flange.

Also significantly, the generally horizontally rearwardly extending portion has an axial length sufficient to underlie at least one-third of an axial length of the second impact attenuator module. In exemplary embodiments, the generally vertically upwardly extending portion has a length of about four inches and the generally horizontally rearwardly extending portion has a length of about six inches.

In still another aspect of the invention, there is provided a crash impact attenuator for attachment to a host vehicle, which comprises a frame, a first impact attenuator module disposed on the frame, and a second impact attenuator module disposed rearwardly of the first impact attenuator module on the frame, wherein the second impact attenuator module comprises an enclosed container having a hollow interior filled with a crash attenuating material, the crash attenuating material being crushable during a vehicular impact to a minimum effective axial length. A support flange is disposed on a lower portion of the frame for supporting the second impact attenuator module, the support flange having a generally horizontally rearwardly extending portion. Importantly, the generally horizontally rearwardly extending portion of the support flange extends rearwardly to a point beyond the minimum effective axial length of the second impact attenuator module when it has been fully crushed by an impact, thereby creating a catch shelf on an upper surface of the generally horizontally rearwardly extending portion of the support flange behind a rearmost portion of the fully crushed second impact attenuator module.

In some embodiments, the second impact attenuator module comprises an angled panel, a rear panel, an angled joint transitioning the angled panel to the rear panel, and a second angled joint transitioning the angled panel to a side panel, the angled panel, the rear panel, and the side panel defining, in part, the hollow interior in which honeycomb material or other suitable crash attenuating material is disposed, wherein the generally horizontally rearwardly extending portion of the support flange extends rearwardly of the second angled joint of the second impact attenuator module.

It should be noted, however, that the unique and patentable aspects of the present invention are applicable to and beneficial for any vehicular mounted or attached crash attenuation system wherein there is a rearmost impact attenuation element comprising crushable material, which is disposed on an underlying support flange, in whole or in part.

The invention, together with additional features and advantages thereof, may best be understood by reference to the following description taken in conjunction with the accompanying illustrative drawing.

DETAILED DESCRIPTION OF THE INVENTION

Figure 1:
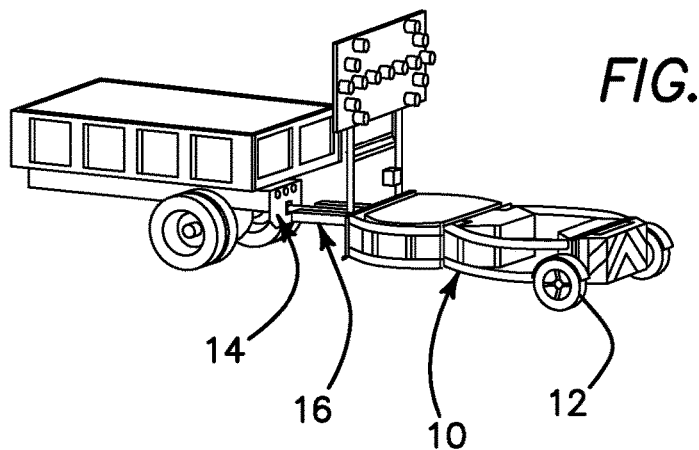
FIG. 1 is an isometric view of an embodiment of a trailer crash attenuator system for use with the present invention.
Figure 3:
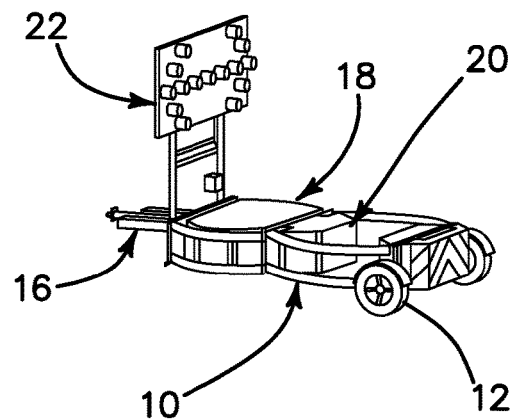
FIG. 3 is an isometric view similar to FIG. 2, showing the system as assembled.
Figure 2:
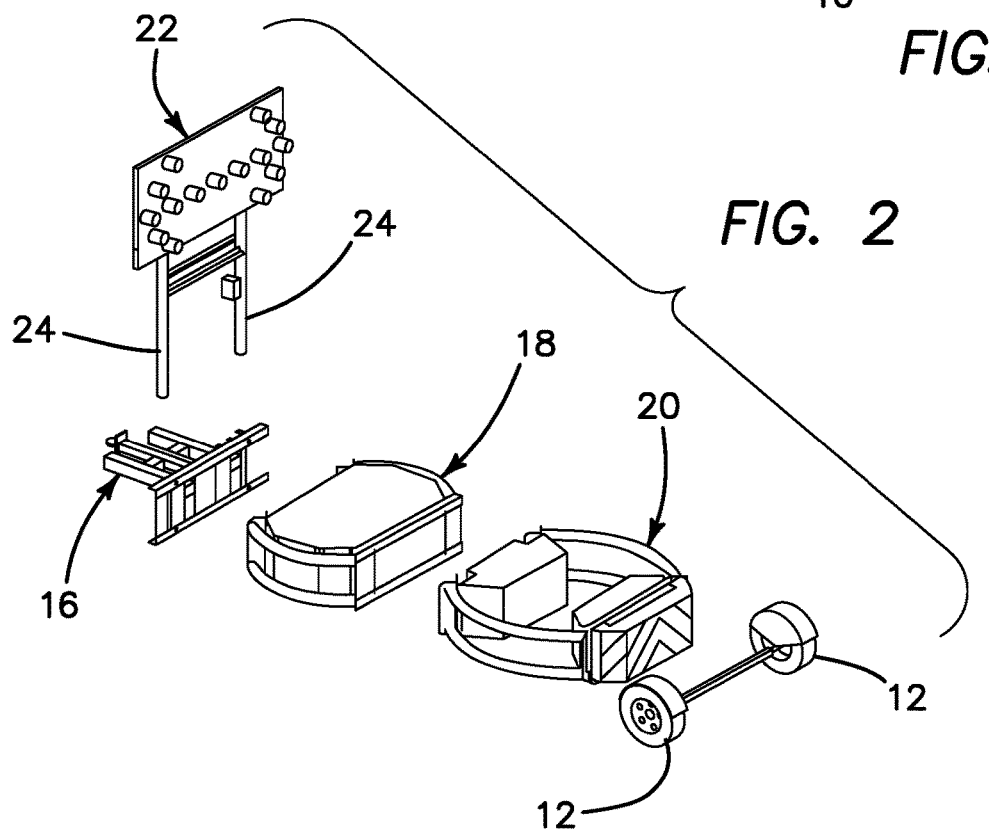
FIG. 2 is an isometric view showing the trailer crash attenuator system of FIG. 1 in a disassembled state.

Referring now to the figures, wherein like reference numerals refer to like elements throughout the figures, there is shown in FIGS. 1-3 a representative embodiment of a trailer-mounted crash attenuator 10 having rear wheels 12, which is secured to the rear end 14 of a vehicle, such as a truck, by a hitch system 16. The trailer-mounted crash attenuator may comprise a strut portion 18 and a cartridge portion 20, as will be described in more detail below. An optional arrow board 22, supported by posts 24, may be employed, but does not form a part of the current invention.

Figure 4:
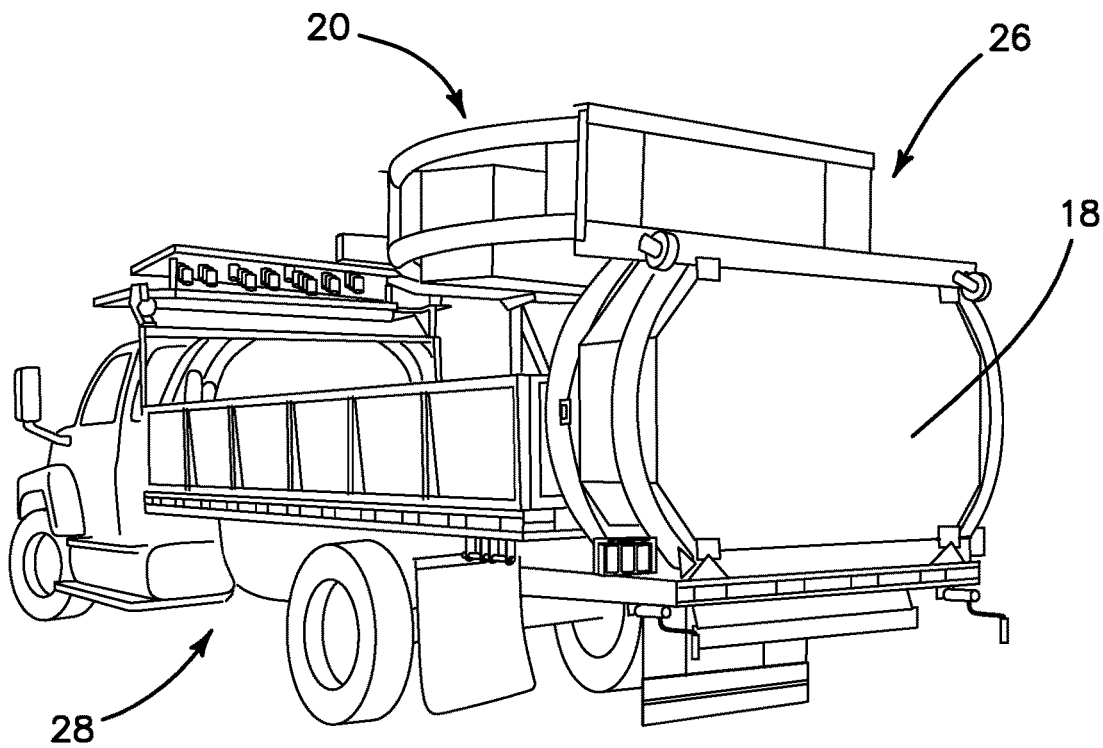
FIG. 4 is a perspective view of an embodiment of a truck-mounted crash attenuator for use with the present invention, wherein the crash attenuator is in a stowed position.
Figure 5:
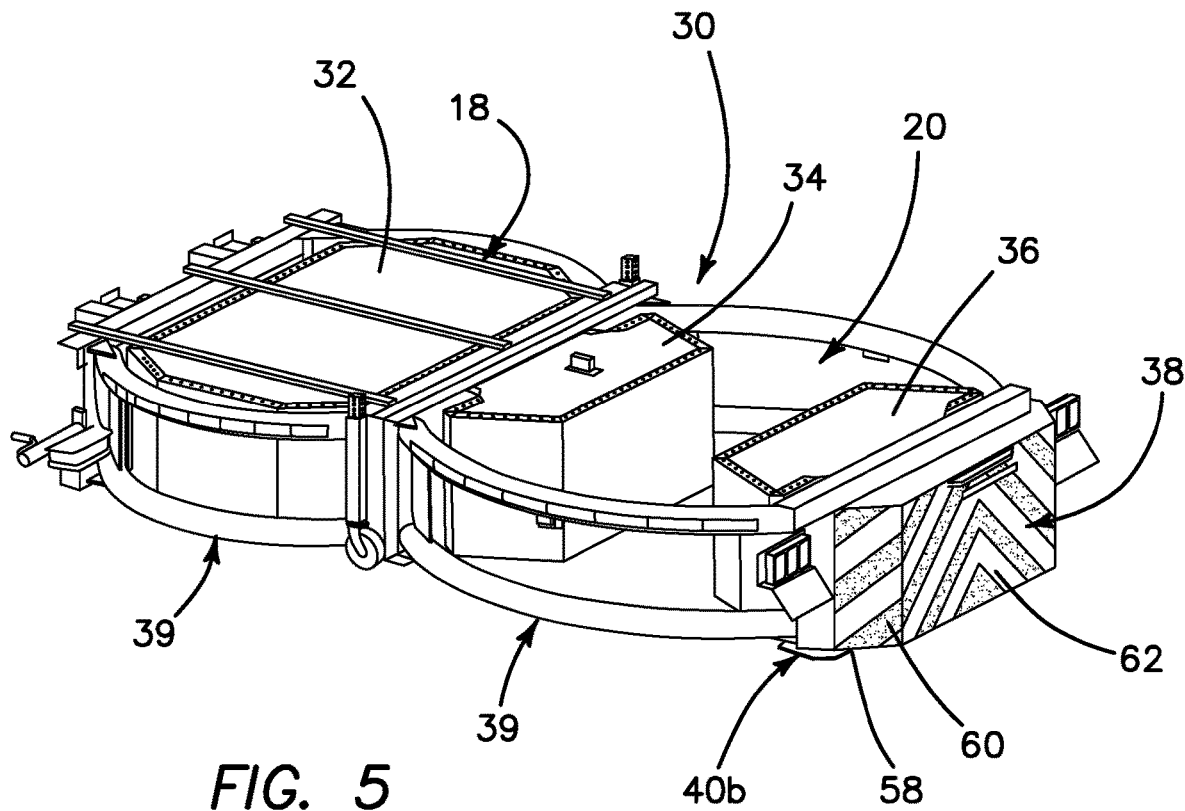
FIG. 5 is an isometric view of a crash attenuator system for use with the invention, which is of a type usable, with suitable modifications, for either trailer-mounted or truck-mounted applications.
Figure 6:
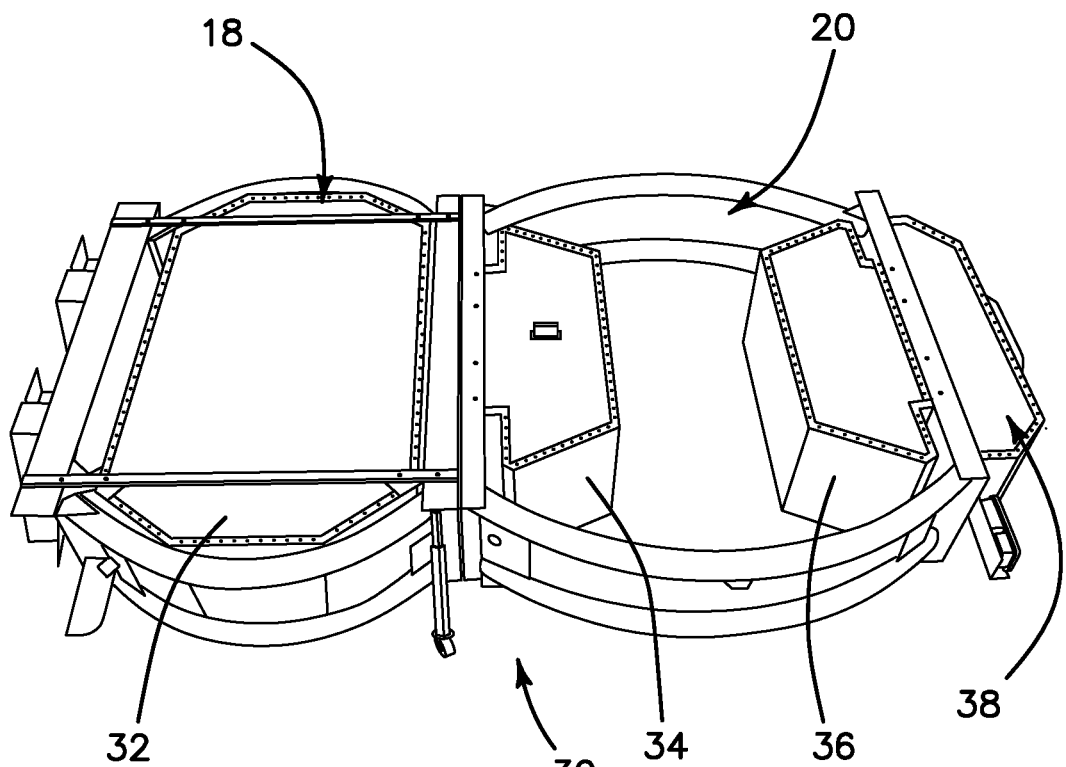
FIG. 6 is a top perspective view of a crash attenuator system similar to that shown in FIG. 5.

FIG. 4 illustrates a representative embodiment of a vehicle-mounted crash attenuator 26, shown in the stowed position, which is also constructed of a strut portion 18 and cartridge portion 20, and is directly mounted on a rear portion of a vehicle 28, typically a truck.

FIGS. 5-10 illustrate, in greater detail, a crash attenuator system 30 which may be utilized as either the trailer-mounted attenuator 10 or the vehicle/truck mounted attenuator 26 discussed above. The attenuator 30 comprises a strut portion 18 and cartridge portion 20 which are joined together as shown and described in U.S. Pat. Nos. 7,438,337 and 7,802,829. The strut portion 18 includes a module 32, comprising a box which encloses honeycomb material suitable for absorbing crash forces and impacts, while cartridge portion 20 includes crash-absorptive or impact attenuator modules 34, 36, and 38. Each of the strut portion 18 and cartridge portion 20 further includes frames 39, comprised of aluminum tubing in the exemplary embodiments, for supporting and mounting the respective modules 32, 34, 36, 38, though any suitable frame for supporting the impact attenuator modules could be used within the scope of the present invention.

Figure 7:
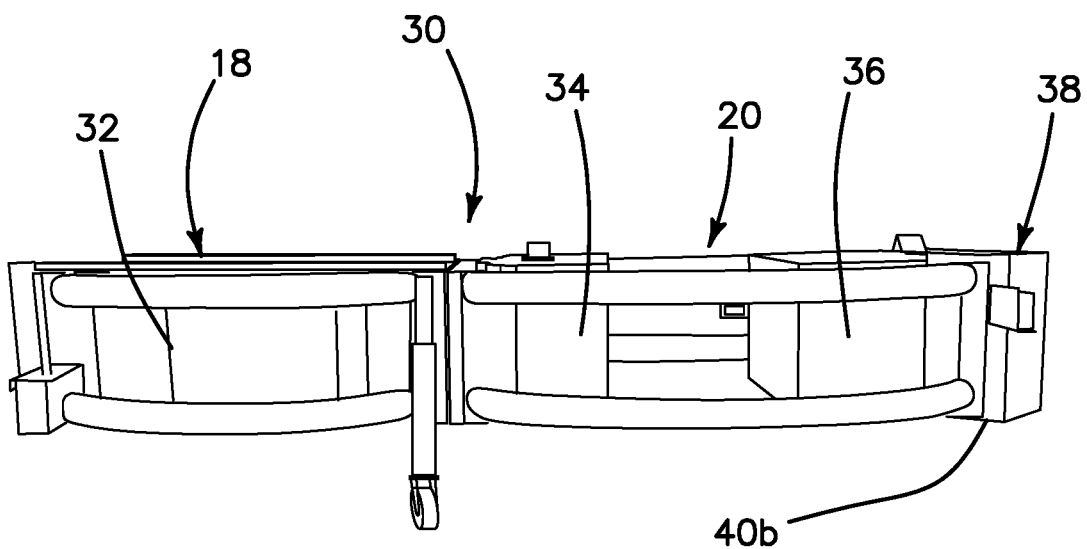
FIG. 7 is a plan view of the crash attenuator system of FIG. 6.
Figure 8:
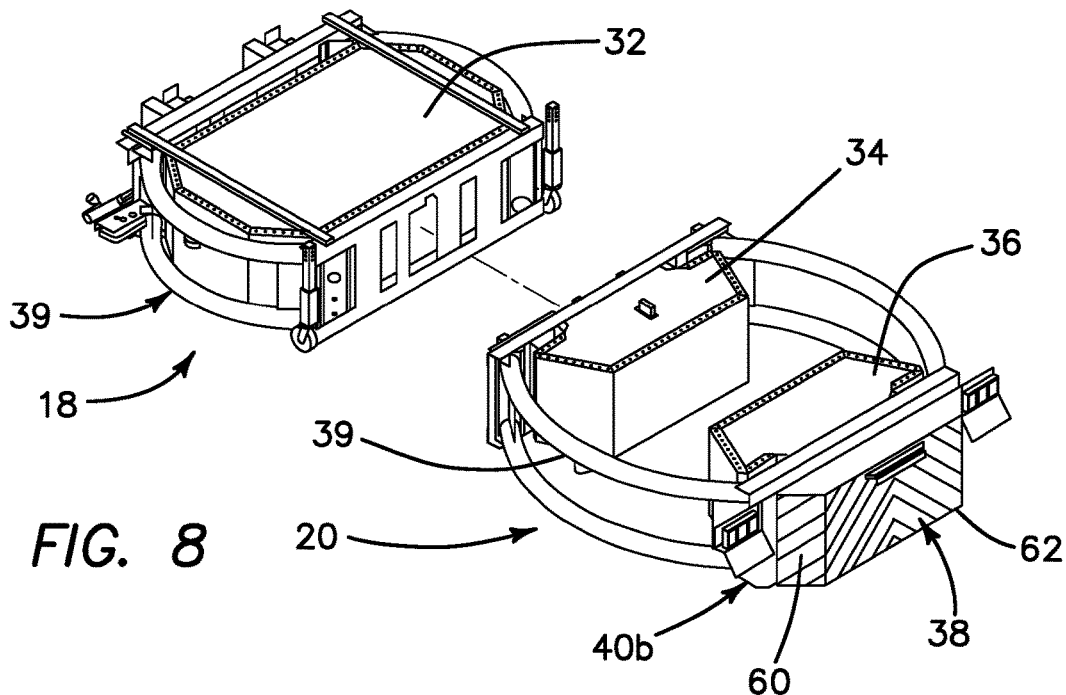
FIG. 8 is an isometric view of a crash attenuator like that shown in FIG. 5, in a disassembled state.
Figure 9:
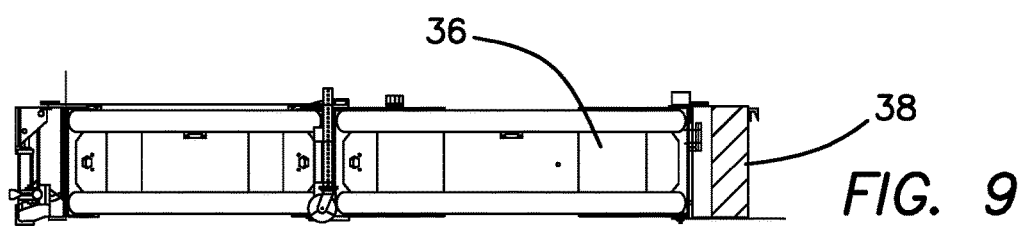
FIG. 9 is a schematic plan view of a crash attenuator like those shown in FIGS. 1-8.
Figure 10:
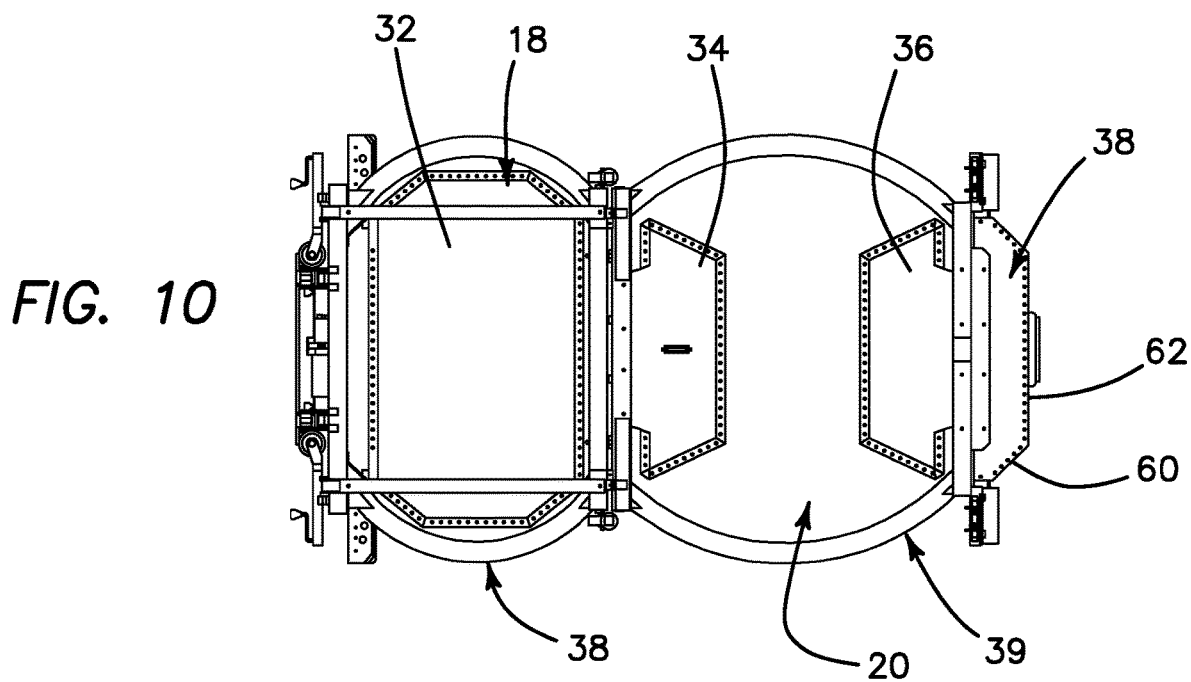
FIG. 10 is a schematic top view of the crash attenuator of FIG. 9.
Figure 11:
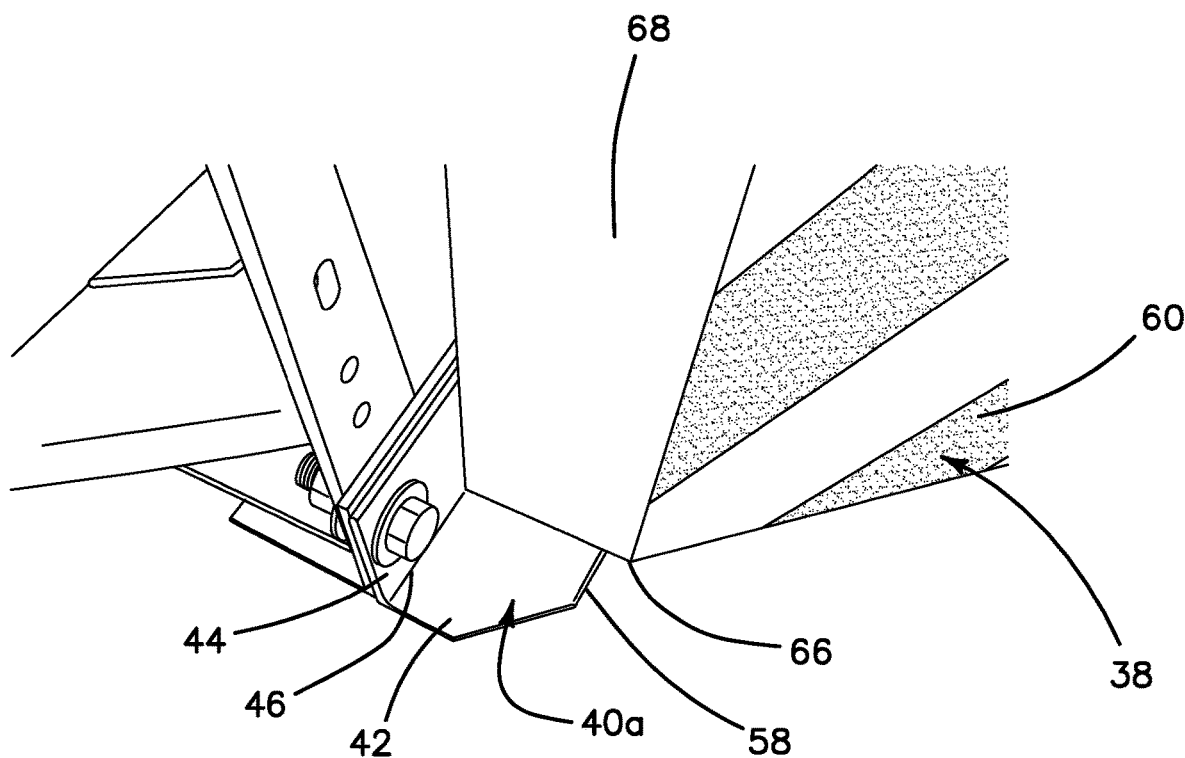
FIG. 11 is a perspective view of a prior art version of a lower angle support flange for a rearmost crash attenuator module of the crash attenuator systems shown herein.
Figure 12:
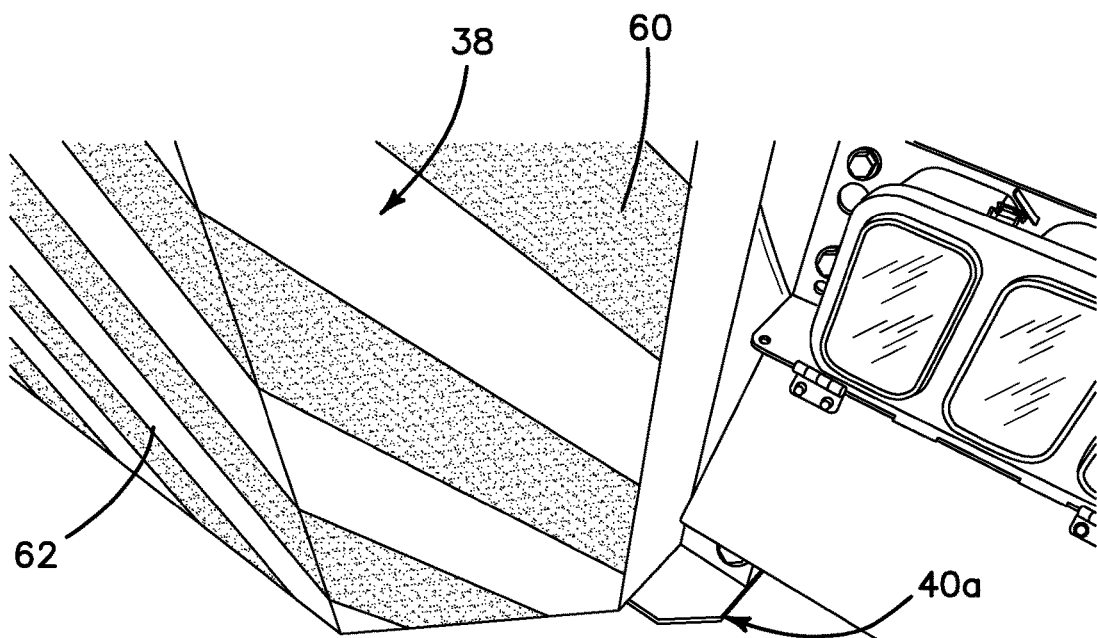
FIG. 12 is a perspective view similar to FIG. 11, showing the opposing side of the lower angle support flange in the prior art system.
Figure 13:
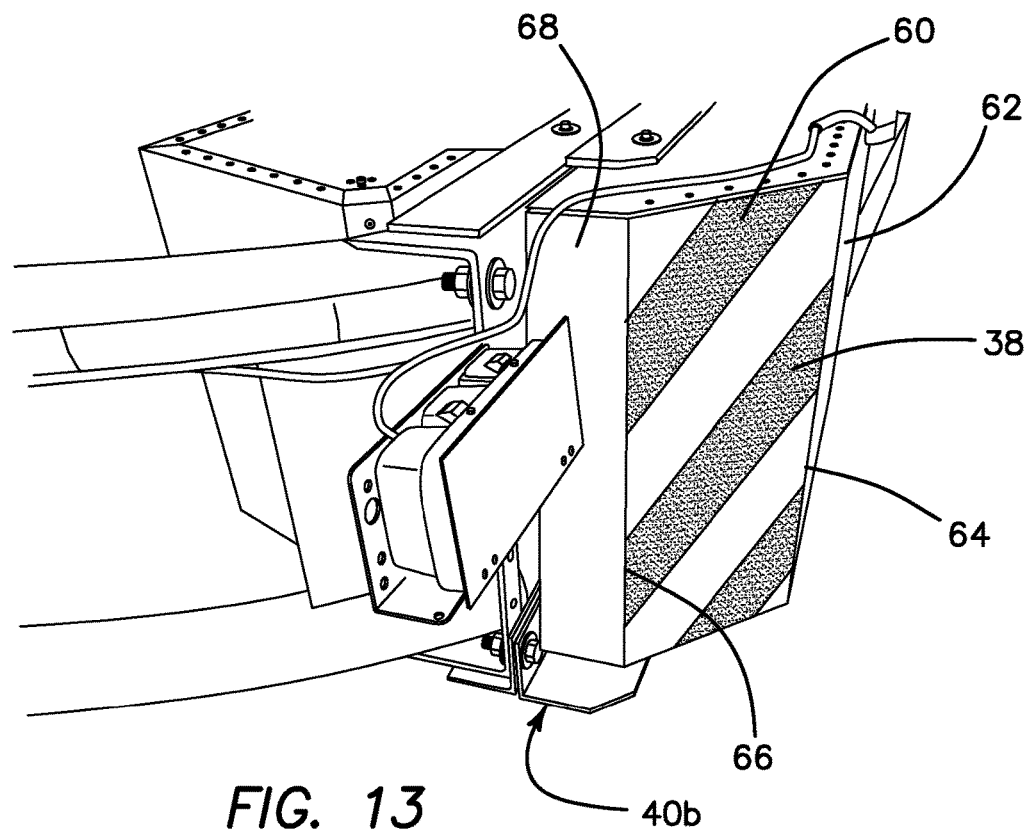
FIG. 13 is a perspective view illustrating a lower angle support flange constructed according to the principles of the present invention.
Figure 14:
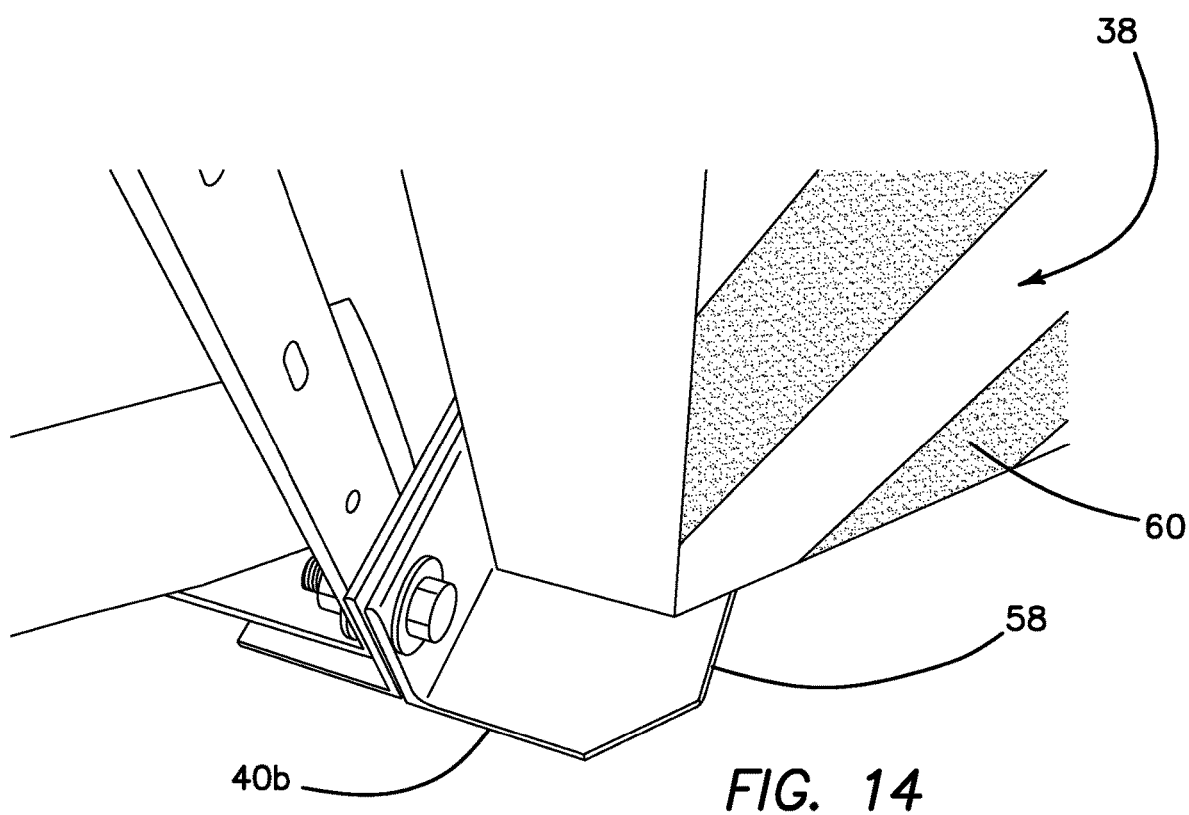
FIG. 14 is an enlarged view of the embodiment of FIG. 13.
Figure 15:
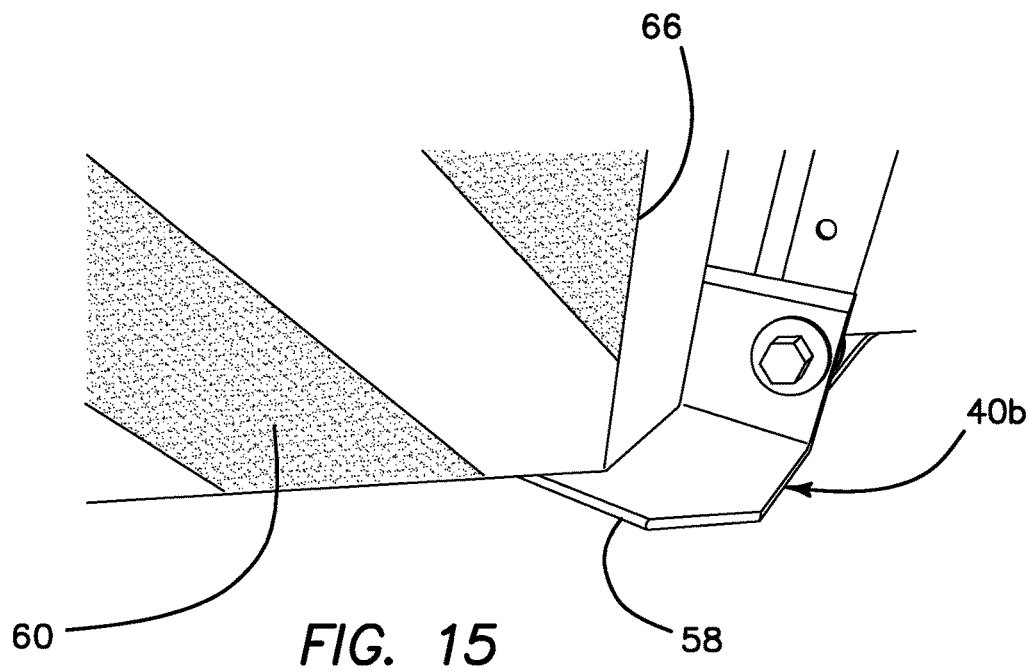
FIG. 15 is a perspective view similar to FIGS. 13 and 14, showing the opposing side of the lower angle support flange of FIGS. 13-14.
Figure 16:
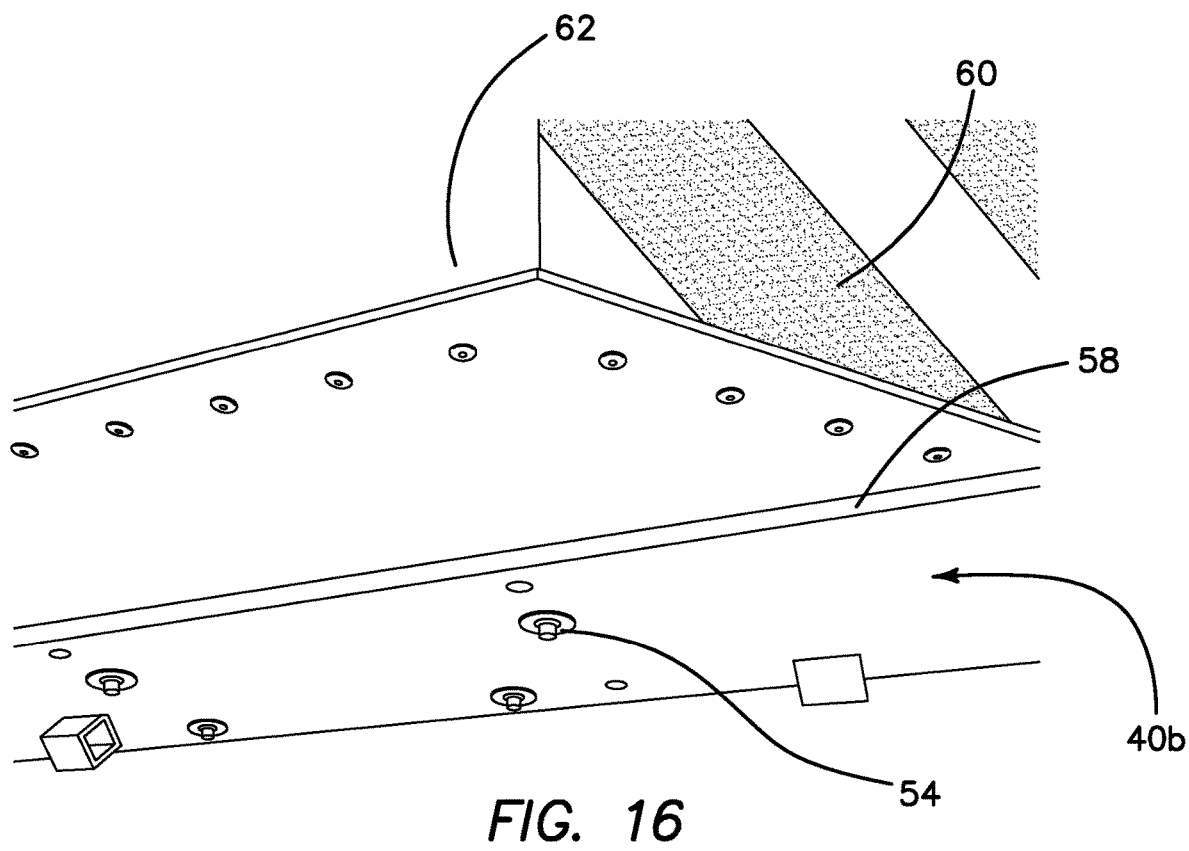
FIG. 16 is a perspective bottom view of the lower angle support flange of FIGS. 13-15.
Figure 17:
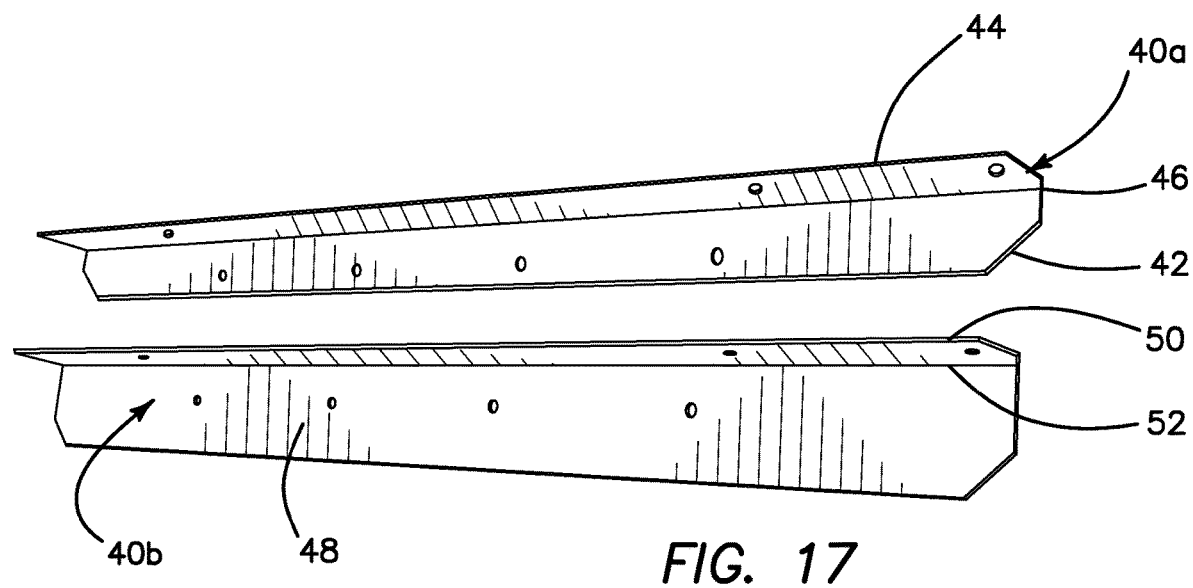
FIG. 17 is view showing a current inventive lower angle support flange on the left adjacent to a prior art lower angle support flange on the right.
Figure 18:
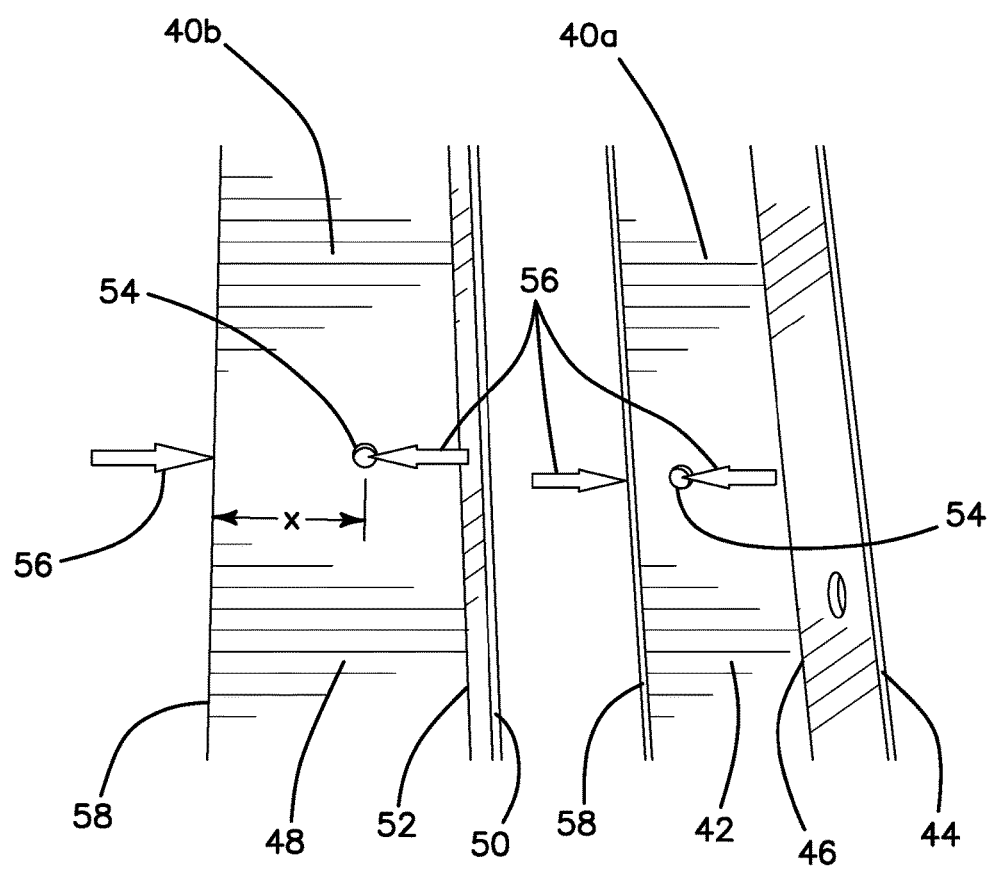
FIG. 18 is an enlarged view of a portion of the flanges shown in FIG. 17, illustrating modifications made in the inventive flange.

In FIG. 7, it can be seen that a lower angle support flange 40b is employed to support the rearmost module 38. This flange 40b is secured to a rear portion of the cartridge 20 and extends across a width of the attenuator. FIGS. 17 and 18 show the flange in two versions—an early prior art version 40*a*, which is the top version in FIG. 17, and is also shown in FIGS. 11 and 12, and the right-most version 40*a* in FIG. 18, as well as a current exemplary inventive version, which is the bottom version 40*b* in FIG. 17 and the left-most version 40*b* in FIG. 18. Significantly, the prior art version 40*a* of the flange is a lower angle comprised of two 4 inch sections 42, 44, joined by an angle 46, while the inventive version of the flange 40 is a lower angle comprised of a 6 inch section 48 and a 4 inch section 50, joined by an angle 52.

As can easily be seen, each flange 40*a*, 40*b* includes box mounting holes 54 on the lower sections 42, 48, respectively. Arrows 56 are intended to illustrate a distance x between the box mounting holes 54 and an edge 58 of the respective flange 40*a*, 40*b*.

In the case of both flanges 40*a*, 40*b*, the distance between the angles 46, 52, respectively and the box mounting hole 54 is the same. However, the distance x between the box mounting hole 54 and the respective edges 58 of each flange is different, with the distance x being substantially larger in the case of the inventive flange 40*b* than in the case of the prior art flange 40*a*. That difference, of course, is approximately the two inches of additional width of the section 58 of the inventive flange 40*b* compared with the width of the section 42 of the prior art flange 40*a*.

In both illustrated embodiments, the respective angles 46, 52 are about 90 degrees, joining a generally vertically extending section 44, 50, respectively, to a generally horizontally extending section 42, 48, respectively. However, except as otherwise noted herein, in the description and claims, the angle 46, 52 need not be strictly 90 degrees, nor do the respective flange sections need to be strictly vertically or horizontally extending. The terms "generally vertically" and "generally horizontally" will be used throughout this application to indicate that there is a tolerance permissible in the construction and orientation of the supporting flange and rearmost crash absorptive module, as long as the flange supports the module to the degree otherwise discussed herein.

The result of this inventive change is illustrated in FIGS. 11-16. FIGS. 11 and 12 illustrate the prior art, wherein prior art flange 40*a* is utilized to support the rearmost module 38. The rearmost module 38 comprises an angled panel 60, a rear panel 62, and an angled joint 64 transitioning the angled panel 60 to the rear panel 62. A second angled joint 66 transitions the angled panel 60 to a side panel 68.

In the prior art arrangement, shown in FIGS. 11 and 12, the shorter section 44 of the lower angle support flange 40*a* extends rearwardly from the angle 46 only four inches, in a generally horizontal direction, and thus the edge 58 of the section 44 is forward of the second angled joint 66 of the crash module 38. In other words, all of the module 38 from the second angled joint 66 rearward, and a portion of the module 38 forward of the second angled joint 66 is unsupported by the flange 40.

In contrast, in the present invention, the section 48 of the flange 40*b* is longer, particularly past or aft of the box mounting holes 54, and consequently, the edge 58 of the flange 40*b* extends rearwardly or aft of the second angled joint 66, in a generally horizontal direction, as illustrated in FIG. 13-16.

While the dimensions of one particular embodiment, involving a two inch extension rearwardly of the section 48 of the flange 40*b* have been described herein, the particular dimensions are not deemed to be critical, but rather representative of the nature of the extension of the flange which Applicant has found to provide unexpected and dramatic crash protection benefits.

In particular, the added distance from the box mounting hole to the edge of the angle creates a "catch edge" as the aluminum honeycomb filled box 38 collapses in an impact. As the box collapses inside the length of the lower angle section 48, the edge 58 of the angle 48 is exposed, creating a catch edge which captures the impacting vehicle, preventing the vehicle from underriding the crash attenuator and thus potentially exposing impacting vehicle passengers to injuries, particularly to the head and upper body where they are the most damaging. On the other hand, with the shorter prior art lower angle section 44, where the side panel of the module box extends beyond the edge 58 of the section 44, crushing of the box causes the box and its honeycomb to fold over the shorter angle edge 58, creating a ramp that allows the impacting vehicle to slide under the attenuator.

This improved effect created by the inventive configuration is magnified because of the length of the box 38 (12 inches in the illustrated embodiment). The honeycomb inside the box becomes stiffer as the honeycomb crushes/compacts. At a point beyond 6 inches of crush, and less than 8 inches of crush, the honeycomb becomes too stiff for the car to compact it further. At this amount of crush, other parts of the attenuator are crushing, but the vehicle is still pressing on the module 38. With the longer 6 inch angle, the honeycomb compresses, forming a pocket, with the catch edge of the 6 inch angle below. In contrast, with the shorter 4 inch angle, the compacted honeycomb stands taller than the 4 inch angle. As the vehicle continues to push on the module 38, the honeycomb can fold over the angle, and potentially release the vehicle nose, allowing underride.

So, a key to the invention is that the angle section 48 is long enough in length so that the module 38, once fully crushed to its minimum effective (fully crushed) axial length by an impacting vehicle, is shorter than the angle section 48, thereby creating the aforementioned catch shelf. In the illustrated example, with a 12 inch long module 38, crushable to a minimum length of between 4 and 6 inches, the angle section 48 must be greater than four inches, and preferably at least 6 inches long, in order to create the noted catch shelf. As a practical matter, the angle section 48 should be more than ⅓ as long as the module 38, and preferably about one-half as long, as is the case for the illustrated embodiment. As also shown in the embodiment, the length of the angle section 48 should extend past the second angled joint 66 on the module 38.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A crash impact attenuator for attachment to a host vehicle, comprising:
   a frame;
   a first impact attenuator module disposed on the frame;
   a second impact attenuator module disposed rearwardly of the first impact attenuator module on the frame; and
   a support flange disposed on a lower portion of the frame for supporting the second impact attenuator module;
   the support flange having a generally horizontally rearwardly extending portion which has an axial length sufficient to underlie more than one-third of an axial length of the second impact attenuator module.

2. The crash impact attenuator as recited in claim 1, wherein the axial length of the generally horizontally rearwardly extending portion of the support flange is sufficient to underlie at least one-half of the axial length of the second impact attenuator module.

3. The crash impact attenuator as recited in claim 1, wherein the axial length of the generally horizontally rearwardly extending portion of the support flange is greater than four (4) inches.

4. The crash impact attenuator as recited in claim 3, wherein the axial length of the generally horizontally rearwardly extending portion of the support flange is about six (6) inches or more.

5. The crash impact attenuator as recited in claim 1, wherein the frame comprises a strut portion and a cartridge portion disposed rearwardly of the strut portion.

6. The crash impact attenuator as recited in claim 5, wherein each of the strut portion and the cartridge portion comprises structural tubes, the first impact attenuator module being disposed in the strut portion and the second impact attenuator being disposed in the cartridge portion.

7. The crash impact attenuator as recited in claim 6, wherein the second impact attenuator module is disposed at a rear end of the cartridge portion, and further comprising a third impact attenuator module disposed forwardly of the second impact attenuator module on the cartridge portion.

8. The crash impact attenuator as recited in claim 1, wherein the support flange comprises the generally horizontally rearwardly extending portion and a generally vertically upwardly extending portion, each of the portions being joined together by an angled portion.

9. The crash impact attenuator as recited in claim 8, wherein the generally vertically upwardly extending portion comprises one or more apertures for securing the support flange to the frame.

10. The crash impact attenuator as recited in claim 8, wherein the generally horizontally rearwardly extending portion of the support flange is longer than the generally vertically upwardly extending portion of the support flange.

11. The crash impact attenuator as recited in claim 1, wherein the second impact attenuator module comprises an angled panel, a rear panel, an angled joint transitioning the angled panel to the rear panel, and a second angled joint transitioning the angled panel to a side panel, the angled panel, the rear panel, and the side panel defining, in part, a hollow interior in which honeycomb material or other suitable crash attenuating material is disposed, wherein the generally horizontally rearwardly extending portion of the support flange extends rearwardly of the second angled joint of the second impact attenuator module.

12. The crash impact attenuator as recited in claim 1, the second impact attenuator module comprising an enclosed container having a hollow interior filled with a crash attenuating material, the crash attenuating material being crushable during a vehicular impact to a minimum effective axial length, wherein the generally horizontally rearwardly extending portion of the support flange extends rearwardly to a point beyond the minimum effective axial length of the second impact attenuator module, thereby creating a catch shelf on an upper surface of the generally horizontally rearwardly extending portion of the support flange behind a rearmost portion of the fully crushed second impact attenuator module.

13. A crash impact attenuator for attachment to a host vehicle, comprising:
a frame;
a first impact attenuator module disposed on the frame;
a second impact attenuator module disposed rearwardly of the first impact attenuator module on the frame; and
a support flange disposed on a lower portion of the frame for supporting the second impact attenuator module, the support flange comprising a generally horizontally rearwardly extending portion and a generally vertically upwardly extending portion, each of the generally horizontally rearwardly extending portion and the generally vertically upwardly extending portion being joined together by an angled portion;
wherein the generally horizontally rearwardly extending portion of the support flange is longer than the generally vertically upwardly extending portion of the support flange.

14. The crash impact attenuator as recited in claim 13, wherein the generally horizontally rearwardly extending portion has an axial length sufficient to underlie at least one-third of an axial length of the second impact attenuator module.

15. The crash impact attenuator as recited in claim 13, wherein the generally vertically upwardly extending portion has a length of about four inches and the generally horizontally rearwardly extending portion has a length of about six inches.

16. A crash impact attenuator for attachment to a host vehicle, comprising:
a frame;
a first impact attenuator module disposed on the frame;
a second impact attenuator module disposed rearwardly of the first impact attenuator module on the frame, the second impact attenuator module comprising an enclosed container having a hollow interior filled with a crash attenuating material, the crash attenuating material being crushable during a vehicular impact to a minimum effective axial length;
a support flange disposed on a lower portion of the frame for supporting the second impact attenuator module, the support flange having a generally horizontally rearwardly extending portion;
wherein the generally horizontally rearwardly extending portion of the support flange extends rearwardly to a point beyond the minimum effective axial length of the second impact attenuator module, thereby creating a catch shelf on an upper surface of the generally horizontally rearwardly extending portion of the support flange behind a rearmost portion of the fully crushed second impact attenuator module.

17. The crash impact attenuator as recited in claim 16, wherein the second impact attenuator module comprises an angled panel, a rear panel, an angled joint transitioning the angled panel to the rear panel, and a second angled joint transitioning the angled panel to a side panel, the angled panel, the rear panel, and the side panel defining, in part, the hollow interior in which honeycomb material or other suitable crash attenuating material is disposed, wherein the generally horizontally rearwardly extending portion of the support flange extends rearwardly of the second angled joint of the second impact attenuator module.

\* \* \* \* \*